United States Patent
Paranjape et al.

(10) Patent No.: US 11,880,391 B2
(45) Date of Patent: Jan. 23, 2024

(54) CLUSTERING SOFTWARE CODES IN SCALABLE MANNER

(71) Applicant: Cylance Inc., San Ramon, CA (US)

(72) Inventors: Sameer Shashikant Paranjape, Portland, OR (US); Bronson Boersma, Buena Park, CA (US); David Alan Greer, Portland, OR (US)

(73) Assignee: CYLANCE, INC., San Ramon, CA (US)

( * ) Notice: Subject to any disclaimer, the term of this patent is extended or adjusted under 35 U.S.C. 154(b) by 0 days.

(21) Appl. No.: 17/235,524

(22) Filed: Apr. 20, 2021

(65) Prior Publication Data

US 2022/0335067 A1    Oct. 20, 2022

(51) Int. Cl.
*G06F 16/28* (2019.01)
*G06F 16/22* (2019.01)

(52) U.S. Cl.
CPC ........ *G06F 16/285* (2019.01); *G06F 16/2255* (2019.01)

(58) Field of Classification Search
CPC ............................ G06F 16/285; G06F 16/2255
See application file for complete search history.

(56) References Cited

U.S. PATENT DOCUMENTS

| | | | |
|---|---|---|---|
| 9,710,646 B1 * | 7/2017 | Zhang | G06F 21/56 |
| 2013/0151519 A1 | 6/2013 | Akhin et al. | |
| 2015/0186649 A1 * | 7/2015 | Humble | G06F 21/564 |
| | | | 726/23 |
| 2018/0060580 A1 * | 3/2018 | Zhao | G06N 20/20 |
| 2020/0074080 A1 * | 3/2020 | Srinivasagopalan | |
| | | | G06F 21/563 |
| 2021/0004583 A1 | 1/2021 | Evan et al. | |

FOREIGN PATENT DOCUMENTS

| | | |
|---|---|---|
| CN | 109445834 | 3/2019 |
| JP | 2013130965 A * | 7/2013 |

OTHER PUBLICATIONS

A.T. Akinwale and F.T. Ibharalu, "The Usefulness of Multilevel Hash Tables with Multiple Hash Functions in Large Databases", University of Agriculture, Abeokuta, Nigeria, https://arxiv.org/ftp/arxiv/papers/0905/0905.4201.pdf (Year: 2009).*

(Continued)

*Primary Examiner* — Mark D Featherstone
*Assistant Examiner* — Brooks T Hale
(74) *Attorney, Agent, or Firm* — Fish & Richardson P.C.

(57) ABSTRACT

Systems, methods, and software can be used to cluster software codes in a scalable manner. In some aspects, a computer-implemented method comprises: obtaining a plurality of software samples; computing one or more first hash results for each of the plurality of software samples; computing one or more second hash results for each of the plurality of software samples based on the one or more first hash results, wherein an amount of the one or more second hash results is less than an amount of the one or more first hash results; determining a similarity output based on the one or more second hash results of two of the plurality of software samples; and clustering the plurality of software samples based on the similarity output to generate one or more software sample clusters.

8 Claims, 6 Drawing Sheets

(56) References Cited

OTHER PUBLICATIONS

A. Jain, S. Soner and A. Gadwal, "Reverse engineering: Journey from code to design," 2011 3rd International Conference on Electronics Computer Technology, 2011, pp. 102-106, https://ieeexplore.ieee.org/document/5941966 (Year: 2011).*

Arden Dertat, "Applied Deep Learning—Part 4: Convolutional Neural Networks", Towards Data Science, https://towardsdatascience.com/applied-deep-learning-part-4-convolutional-neural-networks-584bc134c1e2 (Year: 2017).*

Extended European Search Report in European Appln. No. 22167713.1, dated Sep. 2, 2022, 10 pages.

Mining of Massive Data Sets, Cambridge university press, 2020, 513 pages.

* cited by examiner

CLUSTERING SOFTWARE CODES IN SCALABLE MANNER

TECHNICAL FIELD

The present disclosure relates to clustering software codes in a scalable manner.

BACKGROUND

Clustering software samples based on their features is a well-known technique. However, a software sample comprises many features/functions to be identified, and a clustering system needs to process a very large number of software samples for clustering which is difficult and slows processing time. Furthermore, the types of features and metrics used by a clustering algorithm can also affect the scalability of the clustering system. These features may not be common across software samples, and similarities of features in software samples can be various, which poses challenges in storage space and during computation.

DESCRIPTION OF DRAWINGS

Like reference numbers and designations in the various drawings indicate like elements.

DETAILED DESCRIPTION

A clustering system is used to group software samples, based on features in each software sample, into a specific group. The software samples in the same group comprise similar features/functions of source code. Hashing is often used in clustering. However, considering the type of features and metrics in a software sample and the amount of software samples that the clustering system needs to process, a scalable method for clustering is needed. The present application provides a clustering method to efficiently cluster a plurality of software samples in a scalable manner. The clustering method of the present application applies hashing, similarity calculation, and grouping to cluster the software samples, so that the present disclosure results in a significant storage space reduction, run time memory reduction, and CPU cycle reduction. The clustering techniques will be described in greater detail below, with reference to FIGS. 1 through 6.

Figure 1:
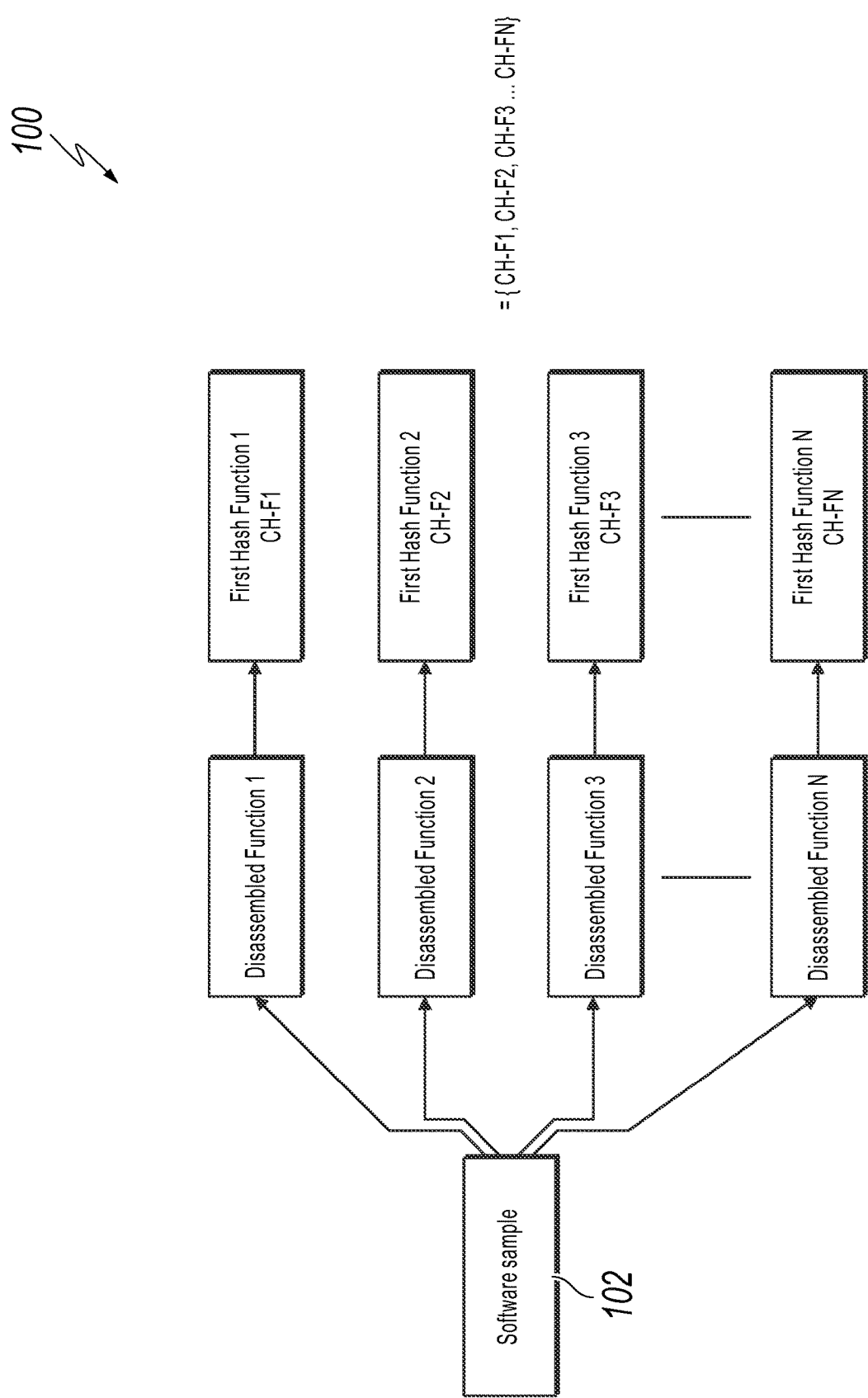
FIG. 1 is a schematic diagram showing an example method that disassembles and hashes a software sample, according to an implementation.

FIG. 1 is a schematic diagram showing an example method 100 that disassembles and hashes a software sample, according to an implementation. The method 100 is used to cluster a software sample 102. In some cases, the method 100 may be used to cluster the software sample 102 into an existing database of software samples, in which the software samples in the database have been identified and grouped based on their features/functions of code. In some cases, the method 100 may use a plurality of software sample 102 to establish a database of software sample which comprises an index of similarity.

The method 100 may start with disassembling functions/features of the software sample 102. For example, the disassembled software sample 102 may comprise N functions, including disassembled function 1, disassembled function 2, disassembled function 3, and so on. In some cases, the software sample 102 may be an executable binary software code. The binary software code is computer software in a binary format. The computer software can be application software, system software (e.g., an operating system or a device driver), or a component thereof.

In some cases, the binary software code can be in a configuration of object code, executable code, or bytecode. An object code is the product of the compiler output of a sequence of statements or instructions in a computer language. Computer programs can be written with source code that is logically divided into multiple source files. Each source file is compiled independently, into a corresponding object file that includes object code. The object codes in the object files are binary machine codes, but they may not be ready to be executed.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

In some cases, the binary software code can be disassembled into assembly code. The assembly code can be parsed into different assembly instructions. The software service platform (e.g., the method 100) can search the assembly instructions to determine network addresses that are accessed by the binary software code.

Furthermore, the method 100 performs a first hashing for each disassembled function. For example, each disassembled function/feature comprises a first hash to hash disassembled function of binary large object (BLOB). The first hash function may comprise small prime product-no-op (SPP-NOP) hashing function.

In some cases, the first hashing may be applied to features/functions in the software sample 102 for a next hashing. In some cases, the first hashing may be applied to features/functions in the software sample 102 for a similarity calculation of source code.

Figure 2:
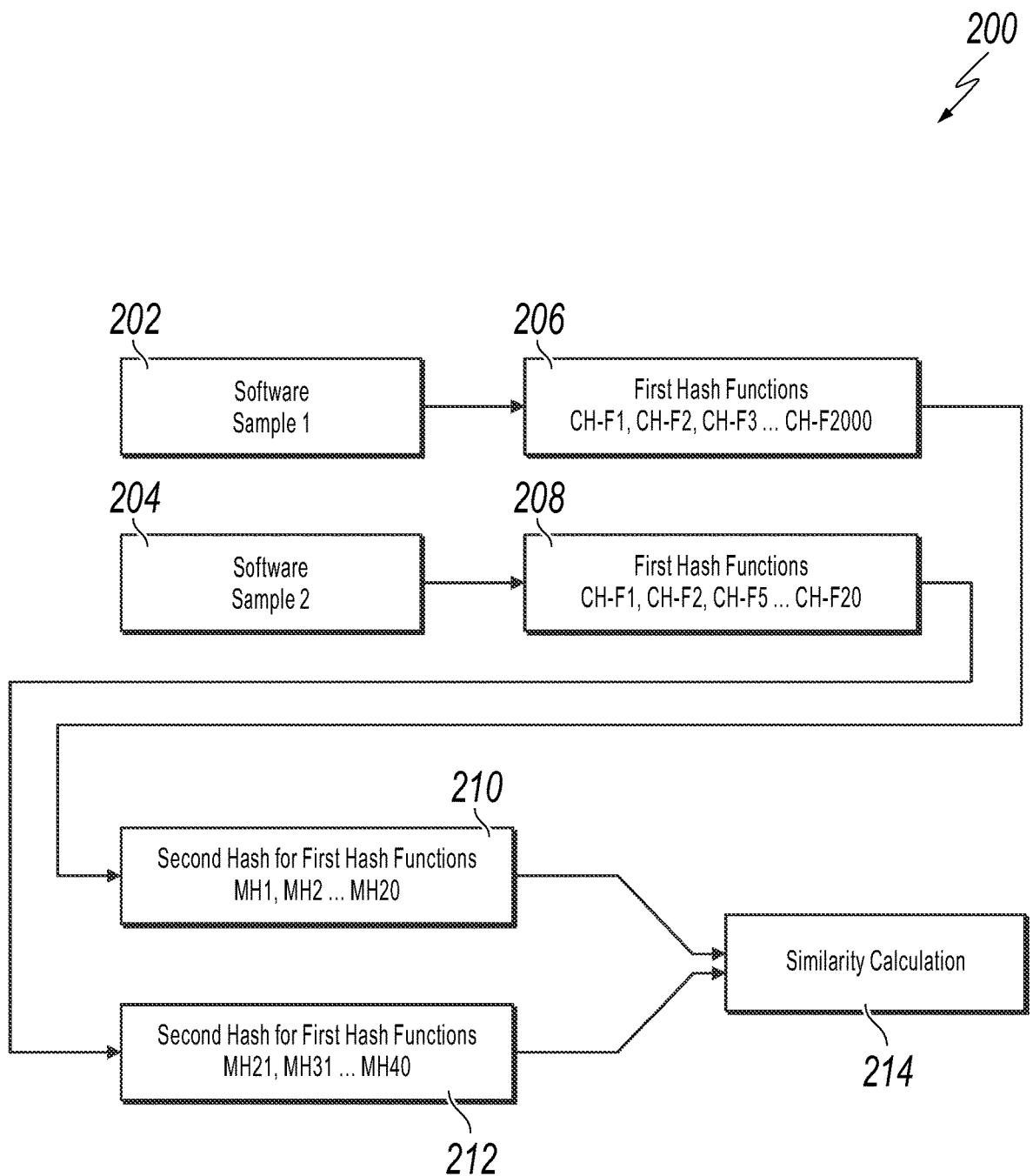
FIG. 2 is a schematic diagram showing an example method that generates a number of mini hashes for software samples for a similarity calculation, according to an implementation.

FIG. 2 is a schematic diagram showing an example method 200 that generates a number of mini hash functions for software samples for a similarity calculation, according to an implementation. In order to perform a similarity calculation for software samples, which is a pairwise comparison, the method 200 may compute a second hashing to software samples 202, 204 which comprise first hash functions 206, 208 to reduce a number of hashes to be considered in the similarity comparison. For example, since the similarity calculation is a pairwise comparison, a computation involved is of O(n^2) nature. For N software samples, a system needs to compute N(N−1)/2 comparisons to complete an entire comparison for N software samples. For example, if there are 100,000 software samples, nearly 5 billion comparisons (i.e., (100,000×99,999)/2=4,999,950,000) are required to complete the comparison of N software samples. Therefore, a second hashing for software samples 202 and 204 may be needed.

Furthermore, in some cases, a similarity calculation may be performed based on the same number of features/hashes between two software samples. For example, the software sample 202 may comprise 2,000 first hashes 206 which are computed based on the disassembled features of the software sample 1 202, and the software sample 2 204 may comprise 20 first hashes 208 which are computed based on the disassembled features of the software sample 2 204. The features in the software samples 202 and 204 may not be common and may cause unnecessary computations.

The method 200 applies a second hashing to the first hashes of functions 206 and 208 of the software samples 202 and 204 to reduce the number of function for a similarity calculation 214. For example, the method 200 computes a fixed number of second hashes 210, and 212 based on the first hashes of functions 206 and 208 for the similarity calculation 214. In some cases, the second hashing may be a mini-hashing performed by a mini-hash algorithm for Jaccard computation, i.e., the similarity calculation 214. The number of the second hashes 210 and 212 may vary based on a system need, as long as the number of the second hash 210 is the same as the number of the second hash 212. In some cases, the number of the mini hash is 20. In some cases, the second hashing may select a hash function like MurmurHash and reduce the number of the first hashing (e.g., N first hash functions) to 20 second hashes. Furthermore, the method 200 utilizes the second hashes 210 and 212 to perform the comparison and to compute the similarity between the software sample 1 202 and the software sample 2 204.

In some cases, a similarity calculation uses Jaccard algorithm which computes similarities between sets of features. For example:
Set A={0, 1, 2, 3}
Set B={1,2,3,4,5,6,7,8,9}
$J(A,B)=|A \cap B|/|A \cup B|=3/10=0.3$ In some cases, the method 200 computes the similarity calculation 214 as below:
Set A={0, 1, 2, 3}=Mini-Hash (Set A)=$A_{mh}$={19522071, 57985267, 609422107}
Set B={1, 2, 3, 4, 5, 6, 7, 8, 9}=Mini-Hash (Set B)=$B_{mh}$ {19522071, 98985290, 709422154}
$J(A,B) \cong |A_{mh} \cap B_{mh}|/$(Mini-Hash-Size)$=1/3=0.33$ Furthermore, Jaccard similarity can also be applied to source code similarity based on the first hashing results. For example:
Sample A={Func-0, Func-1, Func-2, Func-3}={CymH-0, CymH-1, CymH-2, CymH-3}
Sample B={Func-1, Func-2, Func-3, Func-4, Func-5, Func-6, Func-7, Func-8, Func-9}={CymH-1, CymH-2, CymH-3, CymH-4, CymH-5, CymH-6, CymH-7, CymH-8, CymH-9}
$J(A,B)=|A \cap B|/|A \cup B|=3/10=0.3$ Then, Jaccard similarity is applied to source code similarity based on the first hashing results and the second hashing results. For example:
Sample A={Func-0, Func-1, Func-2, Func-3}={CymH-0, CymH-1, CymH-2, CymH-3}={MH-0, MH-1, MH-2}
Sample B={Func-1, Func-2, Func-3, Func-4, Func-5, Func-6, Func-7, Func-8, Func-9}={CymH-1, CymH-2, CymH-3, CymH-4, CymH-5, CymH-6, CymH-7, CymH-8, CymH-9}={MH-0, MH-3, MH-4}
$J(A,B) \cong |A_{mh} \cap B_{mh}|/|A \cup B|/$(Mini-Hash-Size)$=1/3=0.33$ The method 200 computes Jaccard similarity based on mini-hash results. The method 200 selects any hash function like Murmur hash, and selects a fixed number of hashing rounds with different seeds, e.g., 3, 10, and the like, based on a need. For a given set, the method 200 computes multiple values using multiple hashing rounds, and selects a minimum value from multiple hashed values. For example:
Set A={0, 1, 2, 4, 5}
Hashing Function=Murmur Hash & Rounds=3
Rounds 1=Hash each value of set A={100,200,300,400,500}={100}
Rounds 2=Hash each value of set A={700,500,600,800,900}={500}
Rounds 3=Hash each value of set A={1000,1200, 550, 850,50}={50}
Mini-Hash of Set A={100, 500, 50}

The method 200 computes the similarity results based on the mini-hashing results. In one example, the method 200 uses mini-hashes for numerator computation and uses mini-hash size for denominator. For example, based on the similarity results, the method 200 groups the software sample 1 202 and the software sample 2 204 as a group. The method 200 reduces storage space and, by selecting sufficiently high value of hash function count, limits errors in the Jaccard computation to be less than 5% and improves Jaccard computation.

Figure 3:
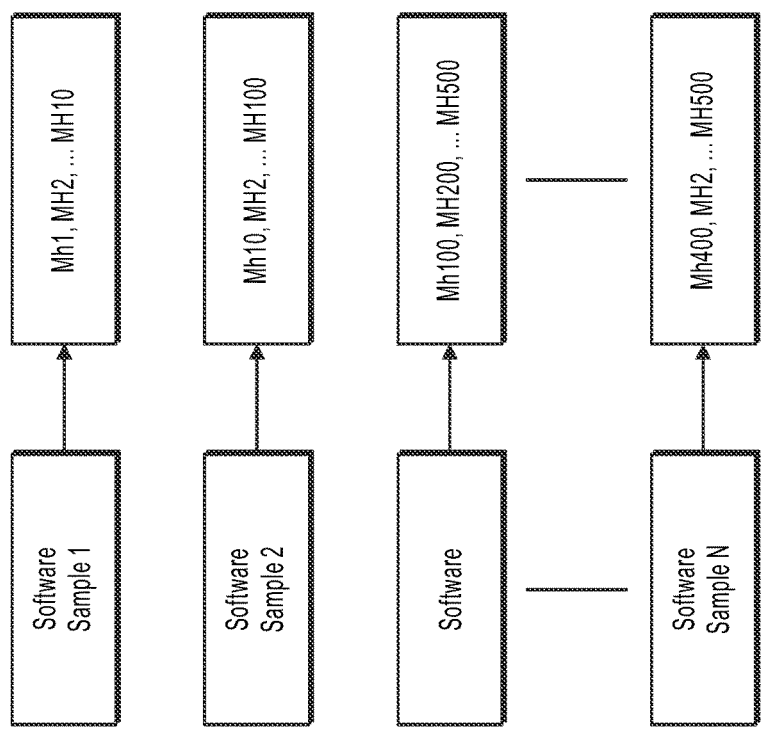
FIG. 3 is a schematic diagram showing an example method of reducing comparison candidates of software samples by using stride hash, according to an implementation.

FIG. 3 is a schematic diagram showing an example method 300 of reducing comparison candidates of software samples by using stride hash, according to an implementation. To achieve the target effects discussed in FIG. 2, the method 300 further provides an additional step to reduce a number of comparison computations to improve the efficiency of computation. In some cases, the method 300 may eliminate unnecessary comparisons. In some cases, the method 300 applies convolutions to the feature set and creates hash indexes, and the hash indexes help in eliminating unnecessary comparisons, e.g., the comparisons that will not output a useful Jaccard similarity. For example, each software sample comprises multiple second hashes, e.g., mini-hashes by murmur hashing or any standard hashing. If there are 100 mini-hashes, e.g., {1,2,3,4, . . . , 97,98,99,100} as input and the stride/convolution is 4, the number of the hash indexes is 100/4=25, such that mini-hashes {1,2,3,4} may include a number 660 served as an index, mini-hashes {1,2,3,4} may include a number 660 served as index, mini-hashes {1,2,3,4} may include a number 660 served as an index, mini-hashes {5,6,7,8} may include a number 55 served as index, and mini-hashes {97,98,99,100} may include a number 660 served as an index, and so on.

Similarly to the method 200 disclosed in FIG. 2, the method 300 receives N software samples, e.g., software sample 1, software sample 2, software sample 3 . . . and software sample N, and computes a second hash for each of the software samples. Each of the software samples comprises the same number of the second hashes. The method 300 computes a stride hashing for the second hashing results of each software sample. For example, the method 300 computes multiple stride hashes, e.g., SH-1, SH-2, SH-3, . . . SH-6, and each stride hash comprises two or more software samples. Stride hash is generated like sliding window, by, e.g., first selecting three second hashes and then selecting the next three second hashes, or by selecting three second hashes and rehashing before selecting the next three hashes, until all second hashes have been selected.

In some cases, the method 300 groups one or more second hash results of the respective software sample into a plurality of stride subgroups. For example, stride hash SH-1 comprises software sample 1 and software sample 3, stride hash SH-2 comprises software sample 1 and software sample 3, and stride hash SH-3 comprises software sample 1 and software sample N. The method 300 selects the software samples into the stride subgroup based on the second hash results. For the software samples in the same stride subgroup, each of the software samples comprises at least one of the same second hash. Furthermore, the method 300 computes a stride hash result for each of the stride subgroups, e.g., SH-1, SH-2 . . . , and SH-N.

With the stride hash mechanism disclosed in the method 300, a number of the pairwise Jaccard computations may be reduced to few hundreds.

Figure 4:
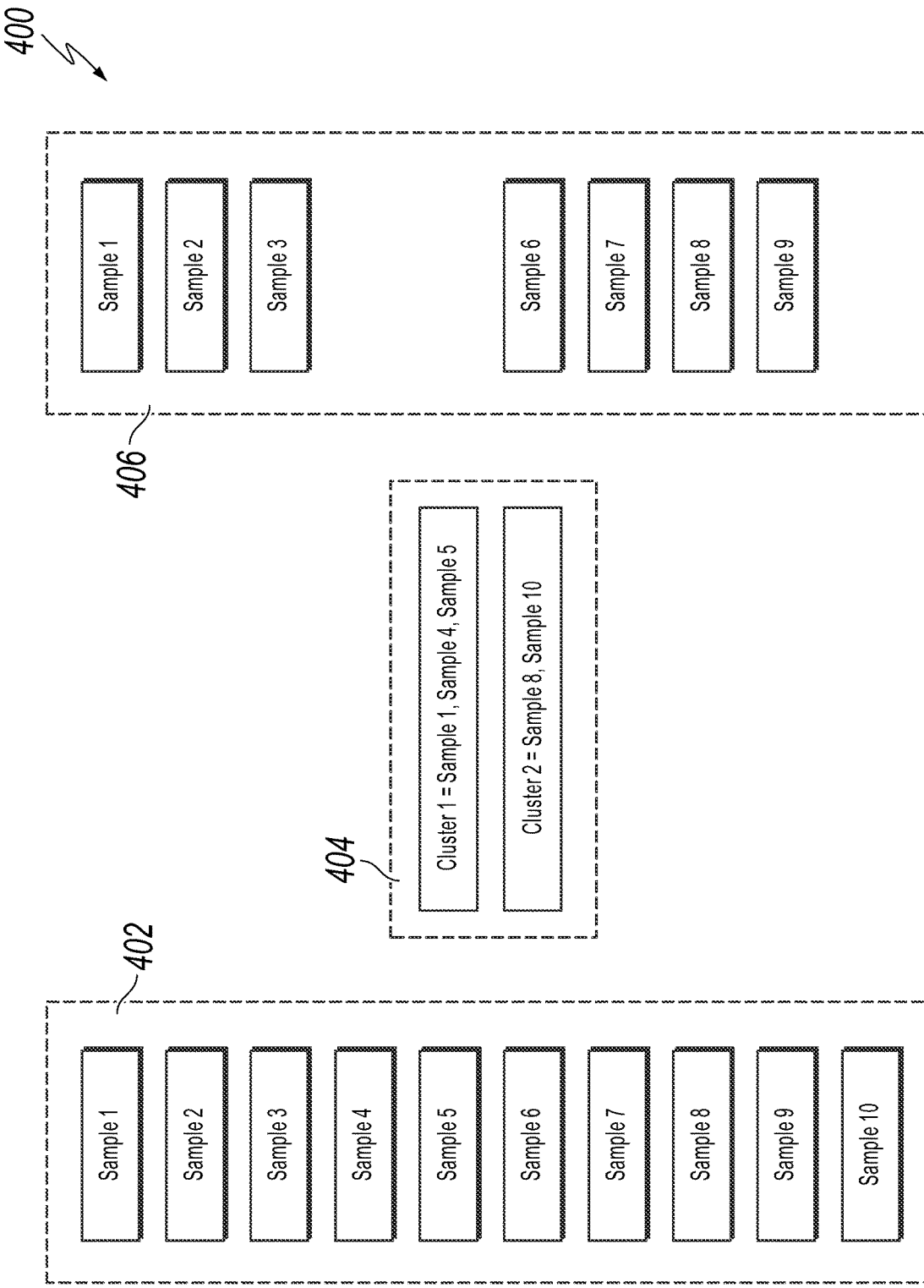
FIG. 4 is a schematic diagram showing an example method of reducing clustering candidates by grouping clustering candidates, according to an implementation.

FIG. 4 is a schematic diagram showing an example method 400 for reducing clustering candidates by grouping clustering candidates, according to an implementation. In some cases, the method 400 may provide a software sample elimination based on previous cluster results for a new cluster run.

By using the method 200 and the method 300 disclosed in FIGS. 2 and 3, multiple software samples are clustered based on hashing results and, as new software samples grow drastically, the method 400 may improve the clustering system and keep the clustering system scalable.

In response to receiving the results of the similarity computations, the method 400 performs clustering for software samples based on their similarities. In some cases, the method 400 runs cluster algorithms at various radius and/or parameters, e.g., density-based spatial clustering of applications with noise (DBSCAN) data clustering algorithm. In this case, radius decides what is the maximum acceptable similarity between samples, in order to decide cluster membership. For example, if radius is 0.1, then all the samples in a given cluster will be similar to each other with similarity of 90% to 100%. Furthermore, parameters include a primary parameter for DBSCAN. The primary parameter may be a minimum number of samples that should be grouped in order to pronounce a given group as a cluster. For example, the primary parameter is set to 5 and radius is set to 0.1, then during clustering, at least five software samples should be found which are similar to each other by 90% to 100% in order to put them in a given cluster. Under the same principle, if there are three software samples found which are 100% similar, these three software samples will not be considered part of a cluster group, because minimum membership group count is five.

In one example, the method 400 runs the cluster algorithm (e.g., DBSCAN) at radius zero, and groups software samples 402 whose first hashes (e.g., SPP-NOP hashes) are similar. Radius zero means grouping software samples if they are 100% similar. When the method 400 runs clustering with radius zero, it basically groups software samples only if they are 100% similar. Since the software samples are 100% similar, the method 400 can skip them for optimization in subsequent cluster runs (either at zero radius or any other radius). In some cases, the method 400 may cluster the software samples 402 using DBSCAN, which uses similarities of the software samples 402 as correlation matrix to be fed to DBSCAN, to form clusters 404 based on similarity values of software samples 402. Since a similarity of software was computed based on source code, the formed clusters 404 indicate source code similarity/recuse. Each of the clusters 404 comprises one or more software samples. For example, cluster 1 comprises Sample 1, Sample 4, and Sample 5, and cluster 2 comprises Sample 8 and Sample 10. Furthermore, the method 400 selects a number of representative software samples from each cluster group for future cluster computations at different radius. For example, the method 400 may select Sample 1 from the cluster 1 and select Sample 8 from the cluster 2. The method 400 generates a new group of sample candidates 406 which only comprises representative software samples from each cluster that is formed for future computations. For example, the sample candidates 406 may only comprise Sample 1, Sample 2, and Sample 3, Sample 6, Sample 7, Sample 8, and Sample 9 since Sample 1 and Sample 8 are the representative samples for the cluster 1 and the cluster 2.

The method 400 of selecting only few representative software samples for future computations may effectively reduce the number of software samples to be clustered on a daily basis and thereby scale a system.

Figure 5:
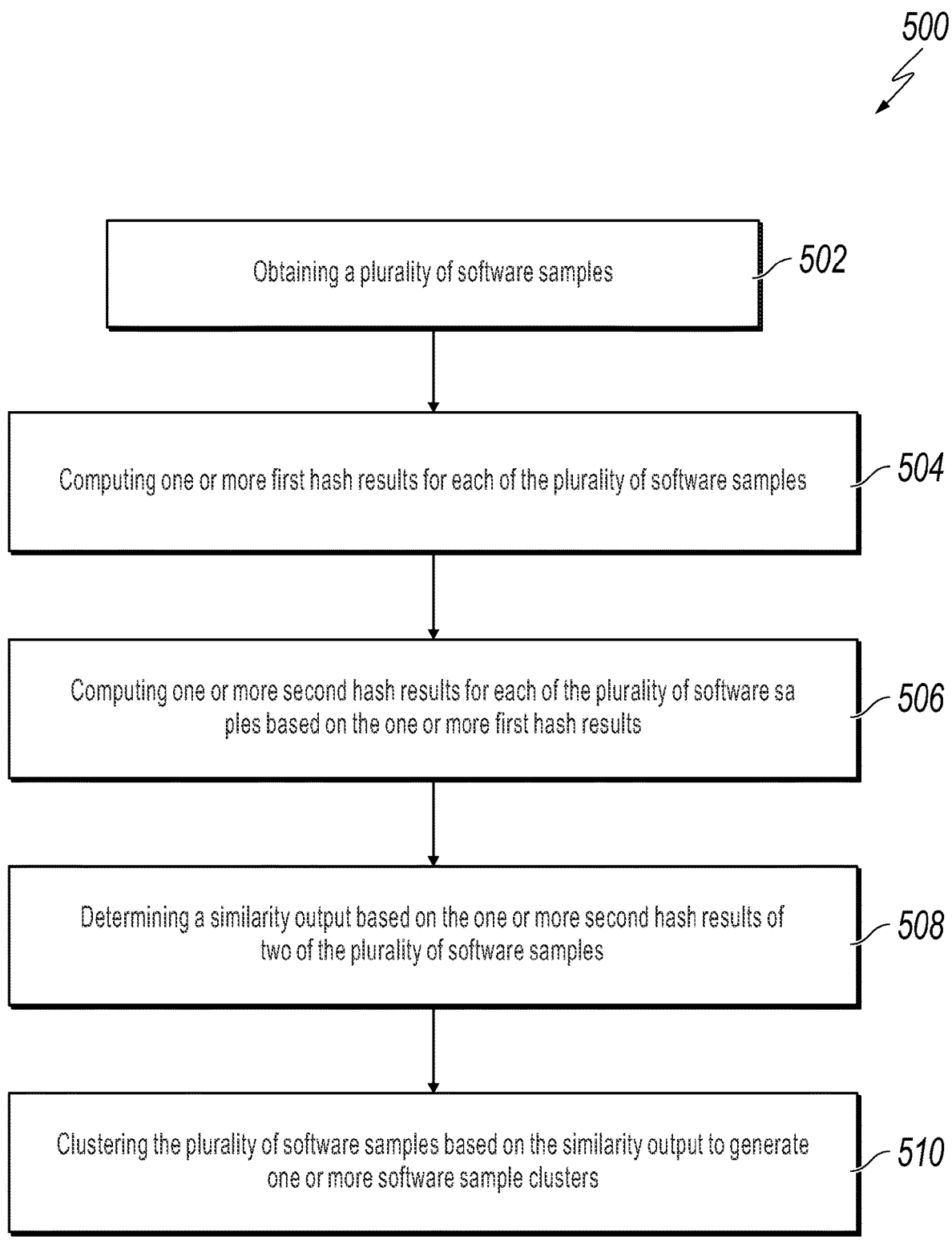
FIG. 5 is a flowchart showing an example method for clustering software samples, according to an implementation.

FIG. 5 is a flowchart showing an example method 500 for clustering software samples, according to an implementation. The method 500 can be implemented by a system for clustering software codes. The example method 500 shown in FIG. 5 can be implemented using additional, fewer, or different operations, which can be performed in the order shown or in a different order.

The technique for clustering software code samples in a scalable manner as described herein can be accomplished by multiple hashes which can reduce an amount of function in a software code. Furthermore, the software samples which have been analyzed and classified by hashes and similarity calculation can be clustered as a subgroup based on the similarity calculation. For a next clustering, only one software sample in each subgroup is required to be included in the next clustering, so that computer performance and efficiency is improved.

The method 500 starts at step 502 with obtaining a plurality of software samples. In some cases, the plurality of software samples may be new additional software samples to be analyzed, classified, or clustered. In some cases, the plurality of software samples may comprise at least one software sample which has been clustered previously.

At step 504, the method 500 computes one or more first hash results for each of the plurality of software samples. In some cases, the first hash may be a SPP-NOP hash which is used to hash each feature/function in a software sample. In some cases, the computing one or more first hash results for each of the plurality of software samples may comprise, for each of the plurality of software samples, disassembling a corresponding software sample to determine one or more functions and generating a first hash result for each of the one or more functions.

At step 506, the method 500 computes one or more second hash results for each of the plurality of software samples based on the one or more first hash results. In some cases, the second hash may be a mini hash which is used to hash the first hash features/functions. In some cases, an amount of the second hash results may be less than an amount of the first hash results. In some cases, the amount of the second hash in any two of software samples may be fixed or the same, in order to perform a similarity calculation between the two software samples. In some cases, the method 500 may further comprises computing stride hash results based on the second hash results, and two or more of the plurality of software samples are selected based on the stride hash results. Furthermore, for each of the plurality of software samples, the method 500 may further comprise grouping the second hash results of the respective software sample into a plurality of stride subgroups and computing a stride hash result for each of the stride subgroups. In some cases, selecting two or more of the plurality of software samples based on the stride hash results may comprise generating a plurality of software sample groups based on the stride hash results. Each software sample in a same software sample group has at least a same stride hash result, and the two or more of the plurality of software samples belong to a same software sample group.

At step 508, the method 500 determines a similarity output based on the one or more second hash results of two of the plurality of software samples. In some cases, the similarity output may be a Jaccard similarity.

At step 510, the method 500 clusters the plurality of software samples based on the similarity output to generate one or more software sample clusters.

In some cases, the method 500 may further be applied to obtain an additional software sample, compute one or more second hash results for the addition al software sample, and cluster the additional software sample with the plurality of software samples. Furthermore, the clustering of the additional software sample with the plurality of software samples may comprise, for each of the software sample clusters, selecting one software sample in a corresponding software sample cluster, and clustering the additional software sample with the selected one software sample of each software sample cluster.

The steps 502 to 510 may be performed by a same operator. For example, the steps 502 to 510 may be performed by a same server. In some cases, steps 502 to 510 may be performed separately, by different operators.

With reference to the description of FIGS. 1-5, the method for scaling clustering system, as described herein, can provide technical effects. The method solves this scalability problem of the clustering system and provides a solution to successfully cluster millions of software samples using hashes and similarities of software samples. The method solves a scalability problem in two steps. In the first step, the method directly addresses the number of computation problem by eliminating unnecessary computations, and in the second step, the method eliminates software samples based on clustering results from previous runs and improves efficiency of computer performance. Furthermore, the clustering system disclosed in the present application can be used to recognize a malware sample, which is either similar to an existing cluster which comprises malware features established from previous clustering runs, or unique to existing clusters which comprise secured software features analyzed from the previous clustering runs. Therefore, the security of the system can be improved.

Figure 6:
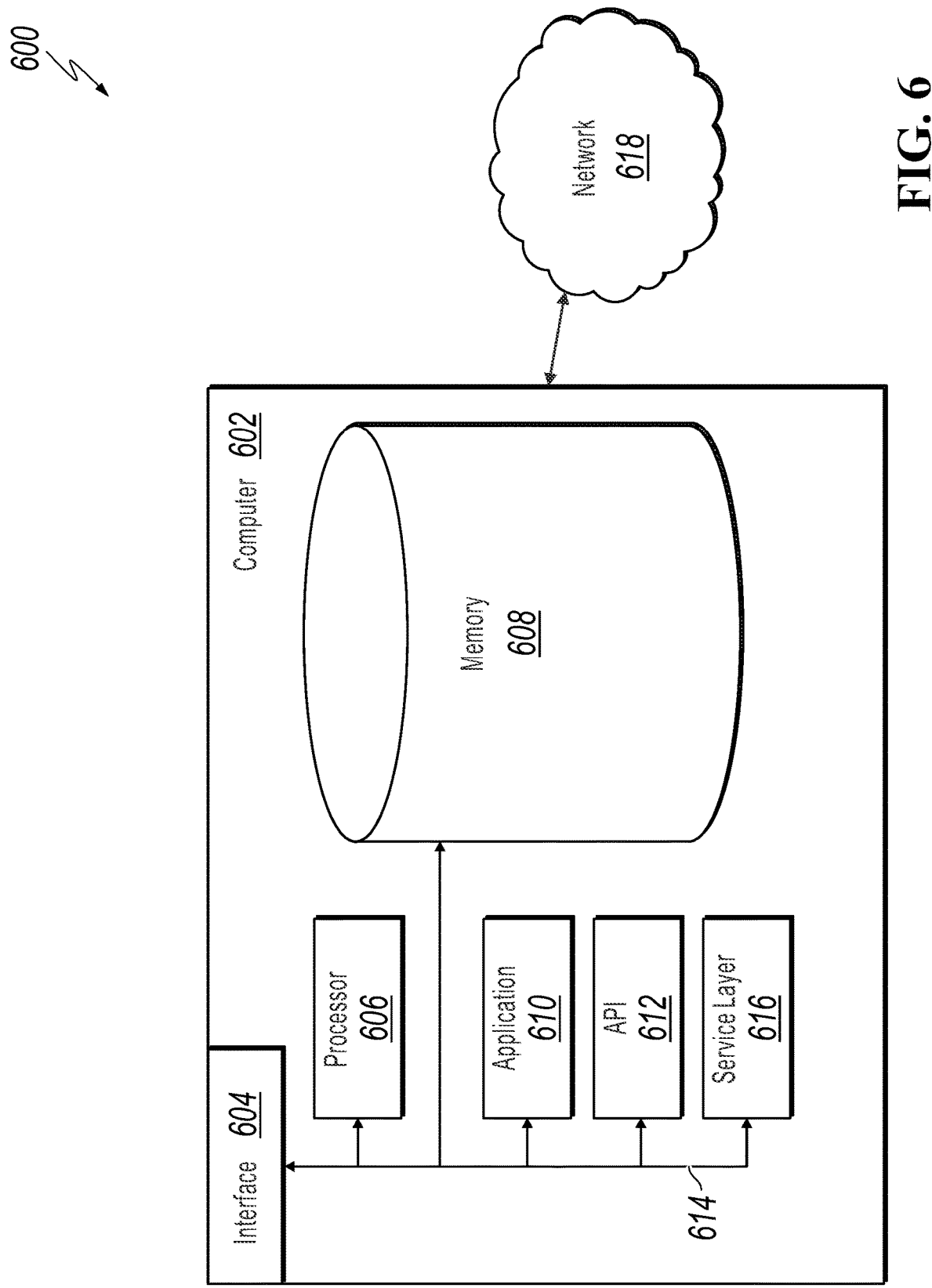
FIG. 6 is a high-level architecture block diagram of a computing system, according to an implementation.

FIG. 6 is a high-level architecture block diagram showing a computer 602 coupled with a network 618, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 618 facilitates communications between the computer 602 and other devices. In some cases, a user, e.g., an administrator, can access the computer 602 from a remote network. In these or other cases, the network 618 can be a wireless or a wireline network. In some cases, a user can access the computer 602 locally. In these or other cases, the network 618 can also be a memory pipe, a hardware connection, or any internal or external communication paths between the components.

The computer 602 includes a computing system configured to perform the algorithm described in this disclosure. For example, the computer 602 can be used to implement the methods 100, 200, 300, 400, and 500 described in FIGS. 1 to 5. The computer 602 can also be used to implement other computing devices. In some cases, the algorithm can be implemented in an executable computing code, e.g., C/C++ executable codes. Alternatively, or in combination, the algorithm can be implemented in an application program, e.g., EXCEL. In some cases, the computer 602 can include a standalone LINUX system that runs batch applications. In some cases, the computer 602 can include mobile or personal computers that run the application program.

The computer 602 may include an input device, such as a keypad, keyboard, touch screen, microphone, speech recognition device, or another device that can accept user information, and/or an output device that conveys information associated with the operation of the computer 602, including digital data, visual and/or audio information, or a GUI.

The computer 602 can serve as a client, network component, a server, a database or other persistency, or the like. In some implementations, one or more components of the computer 602 may be configured to operate within a cloud-computing-based environment.

At a high level, the computer 602 is an electronic computing device operable to receive, transmit, process, store, or manage data and information. According to some implementations, the computer 602 may also include, or be communicably coupled with, an application server, e-mail server, web server, caching server, streaming data server, business intelligence (BI) server, and/or other server.

The computer 602 can receive requests over network 618 from a client application (e.g., executing on a user device) and respond to the received requests by processing said requests in an appropriate software application. In addition, requests may also be sent to the computer 602 from internal users (e.g., from a command console or by another appropriate access method), external or third parties, other automated applications, as well as any other appropriate entities, individuals, systems, or computers.

Each of the components of the computer 602 can communicate using a system bus 614. In some implementations, any and/or all the components of the computer 602, both hardware and/or software, may interface with each other and/or the interface 604 over the system bus 614, using an application programming interface (API) 612 and/or a service layer 616. The API 612 may include specifications for routines, data structures, and object classes. The API 612 may be either computer language-independent or -dependent and refer to a complete interface, a single function, or even a set of APIs. The service layer 616 provides software services to the computer 602. The functionality of the computer 602 may be accessible for all service consumers using this service layer. Software services, such as those provided by the service layer 616, provide reusable, defined business functionalities through a defined interface. For example, the interface may be software written in JAVA, C++, or other suitable language providing data in Extensible Markup Language (XML) format or other suitable format. While illustrated as an integrated component of the computer 602, alternative implementations may illustrate the API 612 and/or the service layer 616 as stand-alone components in relation to other components of the computer 602. Moreover, any or all parts of the API 612 and/or the service layer 616 may be implemented as child or sub-modules of another software module or hardware module, without departing from the scope of this disclosure.

The computer 602 includes an interface 604. Although illustrated as a single interface 604 in FIG. 6, two or more interfaces 604 may be used according to particular needs, configurations, or particular implementations of the computer 602. The interface 604 is used by the computer 602 for communicating with other systems in a distributed environment connected to the network 618 (whether illustrated or not). Generally, the interface 604 comprises logic encoded in software and/or hardware in a suitable combination and operable to communicate with the network 618. More specifically, the interface 604 may comprise software supporting one or more communication protocols associated with communications such that the network 618 or the interface's hardware is operable to communicate physical signals.

The computer 602 includes a processor 606. Although illustrated as a single processor 606 in FIG. 6, two or more processors may be used according to particular needs, configurations, or particular implementations of the computer 602. Generally, the processor 606 executes instructions and manipulates data to perform the operations of the computer 602. In some cases, the processor 606 can include a data processing apparatus.

The computer 602 also includes a memory 608 that holds data for the computer 602. Although illustrated as a single memory 608 in FIG. 6, two or more memories may be used according to particular needs, configurations, or particular implementations of the computer 602. While the memory 608 is illustrated as an integral component of the computer 602, in alternative implementations, memory 608 can be external to the computer 602.

The application 610 comprises an algorithmic software engine providing functionality according to particular needs, configurations, or particular implementations of the computer 602. Although illustrated as a single application 610, the application 610 may be implemented as multiple applications 610 on the computer 602. In addition, although illustrated as integral to the computer 602, in alternative implementations, the application 610 can be external to the computer 602.

There may be any number of computers 602 associated with, or external to, the system 600 and communicating over network 618. Furthermore, the terms "client," "user," and other appropriate terminology may be used interchangeably, as appropriate, without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

Described implementations of the subject matter can include one or more features, alone or in combination.

For example, in a first implementation, a method, comprising: obtaining a plurality of software samples; computing one or more first hash results for each of the plurality of software samples; computing one or more second hash results for each of the plurality of software samples based on the one or more first hash results, wherein an amount of the one or more second hash results is less than an amount of the one or more first hash results; determining a similarity output based on the one or more second hash results of two of the plurality of software samples; and clustering the plurality of software samples based on the similarity output to generate one or more software sample clusters.

The foregoing and other described implementations can each, optionally, include one or more of the following features:

A first feature, combinable with any of the following features, further comprising: computing stride hash results based on the one or more second hash results; and wherein the two of the plurality of software samples are selected based on the stride hash results.

A second feature, combinable with any of the foregoing and following features, wherein the computing stride hash results based on the one or more second hash results comprises: for each of the plurality of software samples, grouping the one or more second hash results of the respective software sample into a plurality of stride subgroups; and computing a stride hash result for each of the stride subgroups.

A third feature, combinable with any of the foregoing and following features, wherein the selecting the two of the plurality of software samples based on the stride hash results comprises: generating a plurality of software sample groups based on the stride hash results, wherein each software sample in a same software sample group has at least a same stride hash result; and wherein the two of the plurality of software samples belong to a same software sample group.

A fourth feature, combinable with any of the foregoing and following features, wherein the computing one or more first hash results for each of the plurality of software samples comprises: for each of the plurality of software samples: disassembling a corresponding software sample to determine one or more functions; and generating a first hash result for each of the one or more functions.

A fifth feature, combinable with any of the foregoing and following features, further comprising: obtaining an additional software sample; computing one or more second hash results for the additional software sample; and clustering the additional software sample with the plurality of software samples.

A sixth feature, combinable with any of the foregoing and following features, wherein the clustering the additional software sample with the plurality of software samples comprises: for each of the software sample clusters, selecting one software sample in a corresponding software sample cluster; and clustering the additional software sample with the selected one software sample of each software sample cluster.

In a second implementation, a computer-readable medium containing instructions which, when executed, cause a computing device to perform operations comprising: obtaining a plurality of software samples; computing one or more first hash results for each of the plurality of software samples; computing one or more second hash results for each of the plurality of software samples based on the one or more first hash results, wherein an amount of the one or more second hash results is less than an amount of the one or more first hash results; determining a similarity output based on the one or more second hash results of two of the plurality of software samples; and clustering the plurality of software samples based on the similarity output to generate one or more software sample clusters.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining a plurality of software samples; computing one or more first hash results for each of the plurality of software samples; computing one or more second hash results for each of the plurality of software samples based on the one or more first hash results, wherein an amount of the one or more second hash results is less than an amount of the one or more first hash results; determining a similarity output based on the one or more second hash results of two of the plurality of software samples; and clustering the plurality of software samples based on the similarity output to generate one or more software sample clusters.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
   obtaining, by a server, a plurality of software samples;
   computing, by the server, a plurality of first hash results for each of the plurality of software samples by disassembling each of the plurality of software samples to obtain a plurality of functions in the respective software sample and performing a first hashing for each of the plurality of obtained functions to obtain the plurality of first hash results, wherein each first hash result corresponds to a respective obtained function in a respective software sample;
   computing, by the server, one or more second hash results for each of the plurality of software samples based on the plurality of first hash results by performing, for each software sample, a second hashing for the plurality of first hash results of the respective software sample to generate the one or more second hash results of the respective software sample, wherein an amount of the one or more second hash results is less than an amount of the plurality of first hash results;
   grouping the plurality of software samples into a plurality of stride subgroups based on the second hash results of the plurality of software samples, wherein the grouping the plurality of software samples into the plurality of stride subgroups based on the second hash results comprises:
      comparing the second hash result of each of the plurality of software samples; and
      grouping two software samples that share at least one same second hash result into a same stride subgroup, wherein in each of the plurality of stride subgroups, each software sample in the respective stride subgroup shares at least one same second hash result;
   determining, by the server, a similarity output based on the one or more second hash results of two of the plurality of software samples in a same stride subgroup;
   clustering, by the server, the plurality of software samples based on the similarity output to generate one or more software sample clusters; and
   detecting malware samples by using the one or more software sample clusters.

2. The computer-implemented method of claim 1, further comprising:
   obtaining an additional software sample;
   computing one or more second hash results for the additional software sample; and clustering the additional software sample with the plurality of software samples.

3. The computer-implemented method of claim 2, wherein the clustering the additional software sample with the plurality of software samples comprises:
   for each of the software sample clusters, selecting one software sample in a corresponding software sample cluster; and
   clustering the additional software sample with the selected one software sample of each software sample cluster.

4. A non-transitory computer-readable medium containing instructions which, when executed, cause a computing device to perform operations comprising:
   obtaining a plurality of software samples;
   computing a plurality of first hash results for each of the plurality of software samples by disassembling each of the plurality of software samples to obtain a plurality of functions in the respective software sample and performing a first hashing for each of the plurality of obtained functions to obtain the plurality of first hash results, wherein each first hash result corresponds to a respective obtained function in a respective software sample;
   computing one or more second hash results for each of the plurality of software samples based on the plurality of first hash results by performing, for each software sample, a second hashing for the plurality of first hash results of the respective software sample to generate the one or more second hash results of the respective software sample, wherein an amount of the one or more second hash results is less than an amount of the plurality of first hash results;
   grouping the plurality of software samples into a plurality of stride subgroups based on the second hash results of the plurality of software samples, wherein the grouping the plurality of software samples into the plurality of stride subgroups based on the second hash results comprises:
      comparing the second hash result of each of the plurality of software samples; and
      grouping two software samples that share at least one same second hash result into a same stride subgroup, wherein in each of the plurality of stride subgroups, each software sample in the respective stride subgroup shares at least one same second hash result;
   determining a similarity output based on the one or more second hash results of two of the plurality of software samples in a same stride subgroup;
   clustering the plurality of software samples based on the similarity output to generate one or more software sample clusters; and
   detecting malware samples by using the one or more software sample clusters.

5. The computer-readable medium of claim 4, wherein the operations further comprise:
   obtaining an additional software sample;
   computing one or more second hash results for the additional software sample; and
   clustering the additional software sample with the plurality of software samples.

6. The computer-readable medium of claim 5, wherein the clustering the additional software sample with the plurality of software samples comprises:

for each of the software sample clusters, selecting one software sample in a corresponding software sample cluster; and
   clustering the additional software sample with the selected one software sample of each software sample cluster.

7. A computer-implemented system, comprising:
   one or more computers; and
   one or more computer memory devices interoperably coupled with the one or more computers and having tangible, machine-readable media storing one or more instructions that, when executed by the one or more computers, perform one or more operations comprising:
   obtaining a plurality of software samples;
   computing a plurality of first hash results for each of the plurality of software samples by disassembling each of the plurality of software samples to obtain a plurality of functions in the respective software sample and performing a first hashing for each of the plurality of obtained functions to obtain the plurality of first hash results, wherein each first hash result corresponds to a respective obtained function in a respective software sample;
   computing one or more second hash results for each of the plurality of software samples based on the plurality of first hash results by performing, for each software sample, a second hashing for the plurality of first hash results of the respective software sample to generate the one or more second hash results of the respective software sample, wherein an amount of the one or more second hash results is less than an amount of the plurality of first hash results;
   grouping the plurality of software samples into a plurality of stride subgroups based on the second hash results of the plurality of software samples, wherein the grouping the plurality of software samples into the plurality of stride subgroups based on the second hash results comprises:
      comparing the second hash result of each of the plurality of software samples; and
      grouping two software samples that share at least one same second hash result into a same stride subgroup, wherein in each of the plurality of stride subgroups, each software sample in the respective stride subgroup shares at least one same second hash result;
   determining a similarity output based on the one or more second hash results of two of the plurality of software samples in a same stride subgroup;
   clustering the plurality of software samples based on the similarity output to generate one or more software sample clusters; and
   detecting malware samples by using the one or more software sample clusters.

8. The computer-implemented system of claim 7, wherein the operations further comprise:
   obtaining an additional software sample;
   computing one or more second hash results for the additional software sample; and
   clustering the additional software sample with the plurality of software samples.

* * * * *